US010535260B2

(12) United States Patent
MacNeille et al.

(10) Patent No.: US 10,535,260 B2
(45) Date of Patent: Jan. 14, 2020

(54) RULES OF THE ROAD ADVISOR USING VEHICLE TELEMATICS

(71) Applicant: Ford Global Technologies, LLC, Dearborn, MI (US)

(72) Inventors: Perry Robinson MacNeille, Lathrup Village, MI (US); David Allen Kowalski, Toledo, OH (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 14/574,526

(22) Filed: Dec. 18, 2014

(65) Prior Publication Data

US 2016/0180707 A1   Jun. 23, 2016

(51) Int. Cl.
*G08G 1/00* (2006.01)
*G08G 1/0962* (2006.01)
*B60W 40/09* (2012.01)
*B60W 40/04* (2006.01)
*G08G 1/0967* (2006.01)

(52) U.S. Cl.
CPC .......... *G08G 1/0962* (2013.01); *B60W 40/04* (2013.01); *B60W 40/09* (2013.01); *G08G 1/096725* (2013.01); *G08G 1/096741* (2013.01); *G08G 1/096775* (2013.01); *B60W 2550/22* (2013.01)

(58) Field of Classification Search
CPC .................................................. B60W 40/09
See application file for complete search history.

(56) References Cited

U.S. PATENT DOCUMENTS

| 5,485,161 A * | 1/1996 | Vaughn ............ G08G 1/096725 |
| | | 342/357.31 |
| 6,871,137 B2 | 3/2005 | Scaer et al. |
| 7,672,774 B2 | 3/2010 | Glaza et al. |
| 8,233,919 B2 * | 7/2012 | Haag ...................... G06Q 50/26 |
| | | 340/539.13 |
| 8,311,734 B2 | 11/2012 | Georgis et al. |
| 2004/0138808 A1 * | 7/2004 | Sanqunetti ............. G01C 21/26 |
| | | 701/516 |
| 2008/0163231 A1 * | 7/2008 | Breen ..................... G06Q 10/06 |
| | | 718/104 |
| 2009/0224942 A1 * | 9/2009 | Goudy .................... G08G 1/164 |
| | | 340/905 |
| 2009/0326799 A1 * | 12/2009 | Crook .................... G06Q 30/02 |
| | | 701/533 |

(Continued)

FOREIGN PATENT DOCUMENTS

CN      1741639 A     3/2006
CN    103426322 A    12/2013

*Primary Examiner* — Truc M Do
(74) *Attorney, Agent, or Firm* — Michael J. Spenner; Brooks Kushman P.C.

(57) ABSTRACT

A vehicle may request road rules information from local jurisdiction information servers and compile the road rules information into compiled rules for a current location of the vehicle. The vehicle may also monitor system bus activity to identify occurrence of a road situation; determine whether a driving behavior is in conflict with a compiled rule corresponding to the road situation for the current location of the vehicle. When a conflict is detected, the vehicle may invoke an interaction associated with the compiled rule to address the driving behavior.

16 Claims, 5 Drawing Sheets

(56) References Cited

U.S. PATENT DOCUMENTS

| | | | |
|---|---|---|---|
| 2010/0070153 A1* | 3/2010 | Bradley | B60W 50/0098 701/103 |
| 2010/0136944 A1* | 6/2010 | Taylor | B60R 25/00 455/404.1 |
| 2010/0207787 A1* | 8/2010 | Catten | G06F 17/30241 340/905 |
| 2010/0217494 A1* | 8/2010 | Heft | B60T 7/22 701/70 |
| 2011/0035139 A1* | 2/2011 | Konlditslotis | G07C 5/008 701/119 |
| 2011/0071701 A1* | 3/2011 | Holub | B60W 50/0098 701/2 |
| 2012/0101855 A1* | 4/2012 | Collins | G06Q 40/08 705/4 |
| 2012/0109451 A1* | 5/2012 | Tan | G01C 21/3664 701/36 |
| 2012/0303256 A1* | 11/2012 | Morgan | G06Q 50/30 701/300 |
| 2013/0031029 A1* | 1/2013 | Davidson | G07B 15/06 705/412 |
| 2013/0293364 A1* | 11/2013 | Ricci | B60K 35/00 340/425.5 |
| 2014/0229060 A1* | 8/2014 | MacNeille | G06F 17/00 701/36 |
| 2014/0280937 A1* | 9/2014 | Miller | H04W 4/90 709/225 |
| 2014/0309789 A1* | 10/2014 | Ricci | B60Q 1/00 700/276 |
| 2014/0309864 A1* | 10/2014 | Ricci | H04W 4/21 701/36 |

\* cited by examiner

RULES OF THE ROAD ADVISOR USING VEHICLE TELEMATICS

TECHNICAL FIELD

Aspects of the disclosure relate to using vehicle telematics to inform a driver and vehicle systems of the rules of the road.

BACKGROUND

Rules that govern interactions between drivers of vehicles may be referred to as rules of the road. These rules may include definitions of circumstances that establish which vehicle has the right of way or priority to go first. These rules may further define differences in rules to apply when signage is present, and what default rules may apply when no signage is present. While the rules of the road may vary from jurisdiction to jurisdiction, it is the responsibility of the driver to be aware of and to comply with local driving rules. Many drivers develop driving habits that seem to work in situations in which they are familiar, without necessarily following the local and current traffic rules.

SUMMARY

In a first illustrative embodiment, a vehicle system includes a processor configured to monitor system bus activity of a vehicle to identify occurrence of a road situation for which driving rules vary by locale; determine whether a driving behavior is in conflict with a compiled rule corresponding to the road situation for a current location of the vehicle; and when a conflict is detected, invoke an interaction associated with the compiled rule to address the driving behavior.

In a second illustrative embodiment, a system includes a computing device associated with a vehicle and executing a road rules application configured to send, to a global jurisdiction information server, a request for addresses of a plurality of local jurisdiction information servers and associated jurisdictional boundaries; request road rules information from the plurality of local jurisdiction information servers having associated jurisdictional boundaries including a location of the vehicle; and compile the road rules information into compiled rules for the location.

In a third illustrative embodiment, a computer-implemented method includes monitoring system bus activity of a vehicle to identify occurrence of a road situation for which driving rules vary by locale; determining whether a driving behavior is in conflict with a compiled rule corresponding to the road situation for a current location of the vehicle; and when a conflict is detected, invoking an interaction associated with the compiled rule to address the driving behavior.

DETAILED DESCRIPTION

Figure 1:
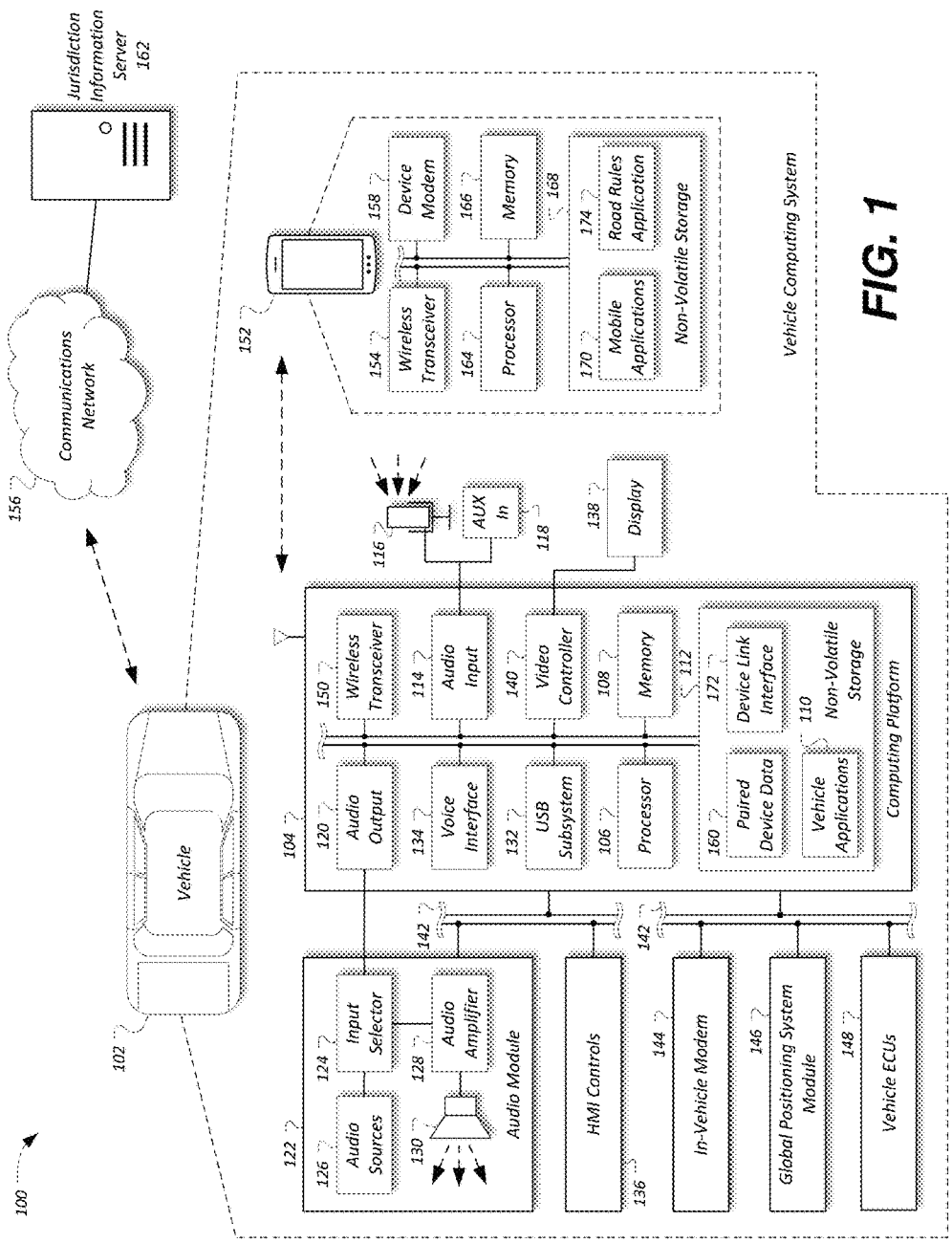
FIG. 1 illustrates an example diagram of a system that may be used to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Rules of the road may change as a driver travels through different legal jurisdictions. As a result, it may be difficult for a driver to know and obey the rules of the road in the current jurisdiction. The most common rules such as following the speed limit or using headlights at night may be relatively uniform among jurisdictions. However, other rules such as turn-on-red acceptability or following distance may vary from jurisdiction to jurisdiction.

A road rules application may be configured to retrieve road rules information from jurisdiction information servers, and compile the road rules information into compiled rules of the road for a vehicle location. The road rules application may utilize the compiled rules to customize trigger criteria indicating when various driving behaviors are in conflict with the rules. These trigger criteria may be referred to as a context for execution of a micro-interaction. In an example, the road rules application may monitor activity from sources such as the vehicle system bus, the Internet, terrestrial and satellite digital radio to determine whether conditions of any of the contexts for execution of the available micro-interactions have been met. If so, the road rules application may provide an opinion regarding the situation according to the response prompt or other information of the micro-interaction. The opinion may be presented according to the micro-interaction using the vehicle human machine interface (HMI) to inform the driver, in a manner based on the type of issue at a time of low driver distraction, and in some cases including information regarding the issue, such as a solution. In an example, if a rule of the road has been broken by the driver, the driver may be informed in a low-urgency high-importance fashion, but if a rule is in the process of being broken and there is time to mitigate then the micro-interaction may be delivered in a high-urgency, high importance fashion.

Some driving authorities provide online access to driving rules, but in a communications style intended for desktop use given an assumption that people will learn the rules and then apply them when they are driving. By use of the road rules application, the driver may be able to learn confirming driving habits within the constraints of the rules of the road if they are informed appropriately of those rules while they are driving. Further aspects of the operation of the road rules application are discussed in detail below.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106. In some cases, the interface with the computing platform 104 may be utilized to direct the driver's attention in a particular direction to convey a potential violation (e.g., to direct a driver to an approaching stop sign). An example of such systems and methods is described in detail in U.S. Pat. No. 8,649,533, filed Oct. 2, 2009, the disclosure of which is hereby incorporated in its entirety by reference herein.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the jurisdictional information server 162 or other remote computing device. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the jurisdictional information server 162 or other network services via the device modem 158. The computing platform 104 may also include a device link interface 172 to facilitate the integration of functionality of the mobile applications 170 into the grammar of commands available via the voice interface 134. The device link interfaced 172 may also provide the mobile applications 170 with access to vehicle information available to the computing platform 104 via the in-vehicle networks 142. An example of a device link interface 172 may be the SYNC APPLINK component of the SYNC system provided by The Ford Motor Company of Dearborn, Mich.

A road rules application 174 may be configured to monitor activity from sources such as the vehicle system buses 142 and information retrieved from the jurisdiction information servers 162. Based on the information, the road rules application 174 may determine when there is a rules of the road situation and may provide an opinion regarding the situation. The opinion may be formed as a micro-interaction that uses the vehicle HMI (e.g., the display 138, prompts provided via the audio module 122) to inform the driver of the road rule that was broken by the driver. In an example, if a rule of the road has been broken by the driver, the road rules application 174 may utilize the device link interface 172 to inform the driver in a low-urgency high-importance fashion, but if a rule is in the process of being broken and there is time to mitigate then the road rules application 174 may utilize the device link interface 172 to deliver the micro-interaction in a high-urgency, high importance fashion.

To determine whether a rule of the road was broken, the road rules application 174 may be configured to determine the current location and heading of the vehicle 102, the current state of road traffic controls such as traffic lights or railroad crossings, and the current road rules for the vehicle 102 location. In an example, the road rules application 174 may determine one or more aspects of the vehicle location, traffic control state, and current rules according to traffic information traversing the vehicle buses 142.

As one possibility, the road rules application 174 may access a safety system vehicle ECU 148 to receive location and trajectory of vehicles 102 in the neighborhood of the vehicle 102. In another example, the road rules application 174 may access a positioning system vehicle ECU 148 to receive the position and trajectory of the vehicle 102 and/or may utilizing utilize a GPS module 146 and navigation information to determine on which road and in which lane the vehicle 102 is traveling.

To allow the road rules application 174 to identify the state of variable state traffic controls such as traffic lights and railroad bridges, the road rules application 174 may receive traffic controls state information from vehicle 102 systems such as a forward facing camera and/or vehicle-to-infrastructure communication system vehicle ECU 148 configured to determine the signal phase and timing (SPaT) and intersection geometric description (IGD).

Road classifications, speed limits, etc. may be determined using a geocoded database of the road network accessible to the road rules application 174, e.g., via a vehicle 102 navigation system. Different rules of the road may apply to boulevards, for example, than are applied to arterial roads, and road designations may vary between jurisdictions and may not be apparent to a driver not familiar with the area. Manually keeping track of rules of the road can be difficult for drivers, especially as the rules of the road vary from jurisdiction to jurisdiction.

Figure 2:
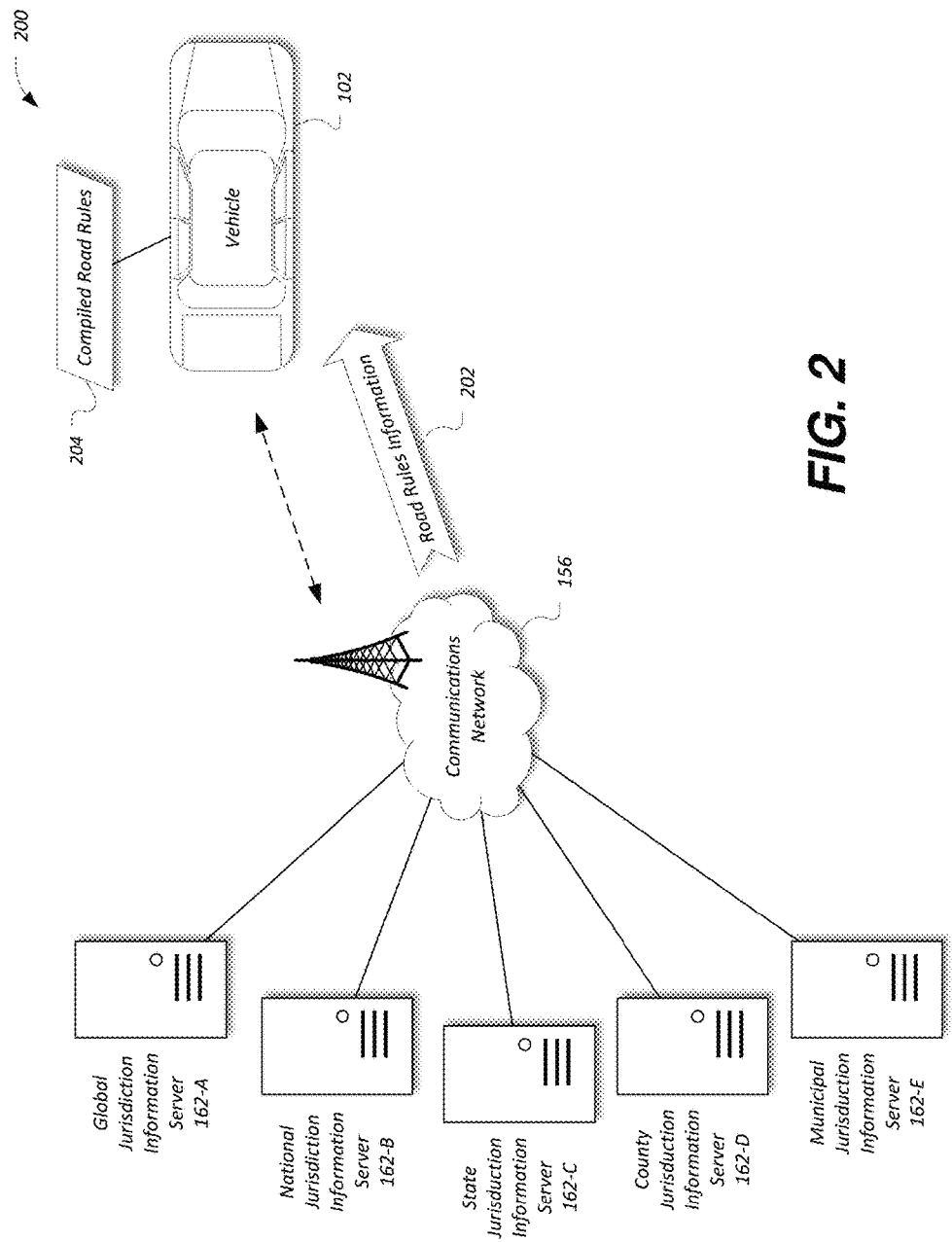
FIG. 2 illustrates an example network including a plurality of information servers storing road rules information.

FIG. 2 illustrates an example network 200 including a plurality of jurisdictional information servers 162 storing road rules information 202. As shown, the network 200 includes a plurality of jurisdictional information servers 162 configured to maintain and server road rules information 202 for use by vehicles 102. The vehicles 102 may be configured to access the jurisdictional information servers 162 relevant to the current vehicle location, and assemble compiled road rules 204 from the road rules information 202. Using the compiled road rules 204 for the vehicle 102 location, the vehicles 102 may be able to automatically analyze driver actions in comparison to the current driving rules for a given locale and situation.

The road rules information 202 may include information regarding what vehicle 102 operations are required, permissible or forbidden for a given location and driving situation. As some examples, the road rules information 202 may include rules regarding headlight use, use of high or low beam headlights, use of headlights when wipers are engaged, turn on red, special lane usage, high-occupancy vehicle lanes, use of turn signals, slow driving and passing rules, towing rules, permissibility of texting or talking on a cellular phone, and boulevard rules, as some non-limiting possibilities.

The jurisdiction information servers 162 may include various servers configured to provide the road rules information 202 to the vehicles 102. In an example, the jurisdiction information servers 162 may include a global jurisdiction information server 162-A configured to provide global or default road rules information 202. The jurisdiction information servers 162 may further include one or more national jurisdiction information servers 162-B configured to provide road rules information 202 specific to the respective country. The jurisdiction information servers 162 may also include one or more state jurisdiction information servers 162-C configured to provide road rules information 202 specific to the respective state, one or more county jurisdiction information servers 162-D configured to provide road rules information 202 specific to the respective county, and one or more municipal jurisdiction information servers 162-E configured to provide road rules information 202 specific to the respective municipality. In addition to providing road rules information 202, the jurisdiction information servers 162 may be further configured to provide geographical information regarding the reach of the local rules.

The system may accordingly include jurisdiction servers 162, each with one or more corresponding geofence areas. For instance, a jurisdiction server 162 for a relatively small area may include a geofence surrounding a particular road, while a jurisdiction server 162 responsible for a larger area may include a geofence covering an entire land mass. Generally the geofences may be hierarchical in that jurisdiction servers 162 responsible for larger areas may completely include areas of more localized jurisdiction servers 162. However, a jurisdiction (such as a public authority for a bridge or tunnel, for example) may span municipalities, states, etc., and accordingly may span multiple jurisdiction server 162 geofence areas. Further, a jurisdiction may have a vertical dimension in which the rules on a bridge may be different than the rules on a road running under a bridge. These hierarchy rules define precedence of the traffic rules, i.e., which road rules information 202 applies when there is a difference among overlapping jurisdictions. Since the jurisdiction servers 162 may be dynamic, the hierarchy of road rules information 202 may be updated as traffic rules and jurisdictional boundaries are updated.

As new nations, states, counties and municipalities are added to the network 200, the jurisdictions may register the additional jurisdiction information servers 162 with the global jurisdiction information servers 162-A or another service configured to maintain the addresses of the current jurisdiction information servers 162.

The road rules application 174 may be configured to determine the current location of the vehicle 102, such as by accessing the GPS module 146 to retrieve current location coordinates of the vehicle 102. Using the current location, the road rules application 174 may be further configured to request road rules information 202 from the jurisdiction information servers 162 for the current location of the vehicle 102. In an example, the road rules application 174 may send a request to the global jurisdiction information server 162-A, which may collect the road rules information 202 from the appropriate national, state, county, and/or municipal servers, and may return the road rules information 202 to the vehicle 102.

In another example, the road rules application 174 may maintain a listing of the jurisdiction information servers 162 (e.g., in the storage 168 or the storage 112), and may request the road rules information 202 from the appropriate national, state, county, and/or municipal servers from the vehicle 102. The road rules application 174 may further be configured to update its listing of the jurisdiction information servers 162. As some possibilities, the road rules application 174 may update the listing of the jurisdiction information servers 162 if a predetermined period of time has passed since the last update, if a predetermined distance has been traveled by the vehicle since the last update, if a predetermined number of key cycles have occurred since the last update, or when notified of changes (e.g., by the global jurisdiction information server 162-A, by another authority with which the jurisdiction information servers 162 register, etc.). The road rules application 174 may accordingly query the relevant jurisdiction information servers 162 for their road rules information 202.

The road rules application 174 may assemble the received road rules information 202 into compiled road rules 204. The compiled road rules 204 may accordingly represent the road rules for the specific location of the vehicle 102. In one non-limiting example, the compiled road rules 204 may apply the global road rules information 202, then override any differences with the national road rules information 202, then override any differences with the state road rules information 202, then override any differences with the county road rules information 202, then override any differences with the municipal road rules information 202. The road rules application 174 may then utilize the compiled road rules 204 as indicative of the total set of rules applicable to the current vehicle 102 location.

Figure 3:
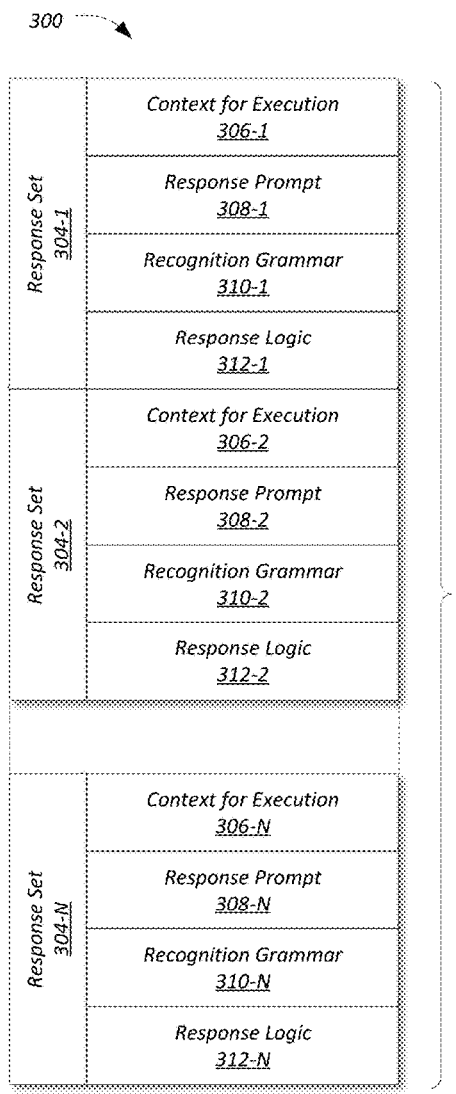
FIG. 3 illustrates an example of a micro-interaction structure for analyzing current conditions in relation to the compiled road rules.

FIG. 3 illustrates an example 300 of a micro-interaction 302 structure for analyzing current conditions in relation to the compiled road rules 204. The micro-interaction 302 may include information useful for the road rules application 174 in providing information to the driver with respect to compliance or non-compliance with the compiled road rules 204. As shown, a micro-interaction 302 may include one or more response sets 304. Each response set 304 defines an aspect of the vehicle-driver interaction, and may include a context for execution 306, a response prompt 308, a recognition grammar 310, and response logic 312.

The context for execution 306 may include one or more conditions configured to activate the particular response set 304 based on non-noncompliance with a compiled road rule 204. In an example, the context for execution 306 may include one or more conditions that, when satisfied, indicates driver non-compliance. These conditions may be customized based on the rules specified by the compiled road rules 204. For instance, a minimum following distance rule may include a condition that may be customized according to a minimum following distance parameter specified by the based on the rules specified by the compiled road rules 204. In an example, the actual following distance may be determined by information provided via the in-vehicle network 142 from a radar unit for an adaptive cruise control system of the vehicle 102. Accordingly, the compiled road rules 204 may be indicative of the vehicle information to be checked to determine compliance with the rules, and the context for execution 306 may be a specification of a particular rule of the compiled road rules 204 indicated in terms of vehicle 102 information that is available to the road rules application 174, e.g., over the vehicle bus 142. In an example, the context for execution 306 may include identification of the current vehicle 102 as being located at an intersection. In another example, the context for execution 306 may include a time of day. In yet a further example, the context for execution 306 may include proximity to other vehicles 102.

Figure 4:
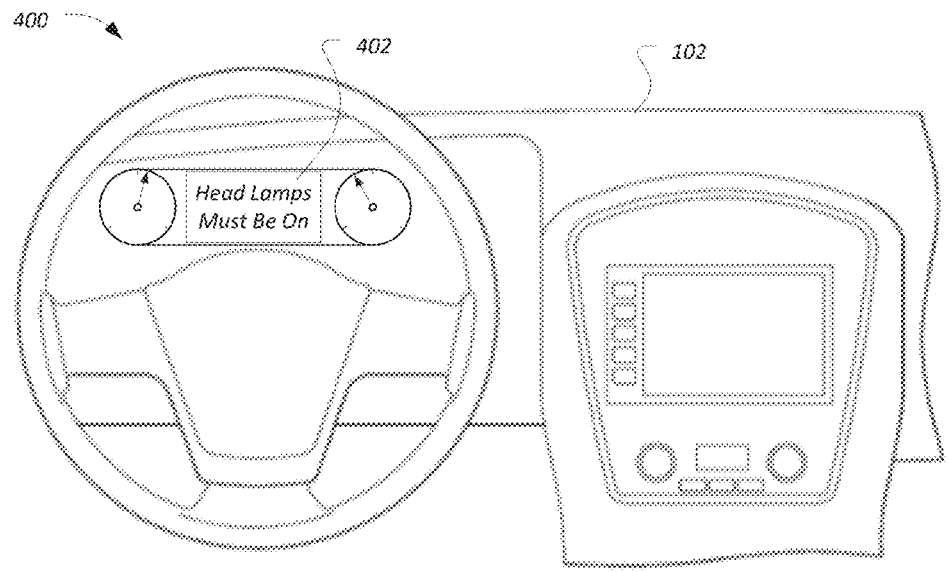
FIG. 4 illustrates an example of a response prompt of a micro-interaction provided in a display within a gauge cluster of the vehicle.

The response prompt 308 may include initial utterances or other prompt information to be provided by the vehicle 102 to the driver when the conditions of the context for execution 306 are satisfied. In an example, if the context for execution 306 specifies a nighttime condition and headlights are off, the response prompt 308 may include a request for the driver to turn on the headlights. FIG. 4 illustrates an example 400 of a response prompt 308 of a micro-interaction 302 provided in a display 138 within a gauge cluster 402 of the vehicle 102.

Returning to FIG. 3, the recognition grammar 310 may include one or more spoken words or other driver actions that may facilitate the integration of functionality of the current stage of the micro-interaction 302 into the grammar of commands available via the voice interface 134. One example of a natural language recognition grammar 310 is described in "Speech Recognition Grammar Specification Version 1.0" W3C Recommendation 16 Mar. 2004, available at www.w3.org/TR/speech-grammar. Another example of a natural language recognition grammar 310 may be the speech recognition system grammars distributed by Nuance Communications, Inc. of Burlington, Mass. In a more specific example to the illustrated situation, the recognition grammar 310 may include commands, such as "help" or "why."

The response logic 312 may include one or more conditions that, when satisfied, may cause the micro-interaction 302 to proceed to another response set 304. In many cases, the response logic 312 may simply cause the micro-interaction 302 to conclude. In other cases, however, the response logic 312 may reference other response sets 305 to provide for a dialog between the vehicle 102 and the driver with respect to the current detected driving issue.

As mentioned in some examples above, one possible use case for the road rules application 174 may involve headlight control. Most jurisdictions require headlights at night, but exactly what determines night may vary between jurisdictions. For instance, some jurisdictions specify road rules information 202 indicating legal twilight as when the sun drops below the horizon by 5°, while other jurisdictions specify road rules information 202 indicating headlights are to be engaged 30 minutes past sunset, while still other jurisdictions specify road rules information 202 indicating that headlights must be used at sunset. The road rules application 174 may compute the time of sunset by utilizing vehicle 102 location information received from the global positioning system module 146, and performing a lookup of sunset time via querying of a server over the communications network 156. Based on the sunset time and the compiled road rules 204 regarding the headlights local rule, the road rules application 174 may determine whether context for execution 306 for a headlights micro-interaction 302 is satisfied. If so and the headlights should be on but are not, the road rules application 174 may invoke the micro-interaction 302 whose context for execution 306 are satisfied, in order to inform the driver the headlights need to be on, as specified by the micro-interaction 302. FIG. 4 illustrates an example response prompt 308 displayed in a vehicle 102 gauge cluster 402 indicating for the driver to turn on headlights. Responsive to the micro-interaction 302, the driver may request the road rules application 174 to turn the headlights on, or may turn them on his or herself. Otherwise, the driver may request the headlights remain off and the road rules application 174 may honor that request. If the driver does not respond, then the road rules application 174 may turn the lights on and, if the vehicle 102 has a system for drowsy driver, potentially invoke drowsy driver functionality to alert the driver to his or her drowsy condition.

Another possible use case for the road rules application 174 may involve high and low beam headlight control. Many jurisdictions may specify road rules information 202 indicating that it is mandatory to switch from high to low headlight beams when in the vicinity of another driven vehicle to prevent dazzling the other driver. The exact distances specified by the road rules information 202 may vary, however, and may further include local recommendations for a specific community, road, road segment etc. In an example, on a major highway it may be safe to leave high beams on when there is approaching traffic if the vehicle 102 is traveling along an outside of a turn. Accordingly, the road rules application 174 may be configured to utilize vehicle sensors and current navigation information to determine when the vehicle 102 has high beams on and is approaching another vehicle 102. If such a condition exists in contravention of the context for execution 306 of a micro-interaction 302 for high beam usage as tailored for the compiled road rules 204, the road rules application 174 may invoke the micro-interaction 302 to address the high beam condition. For instance, the road rules application 174 may direct the vehicle 102 to lower the beams automatically, or may inform the driver of the need to lower the beams. In some instances, the road rules application 174 may be further configured to determine whether to automatically lower the beams or direct the driver to do so based on additional information. For instance, the road rules application 174 may elect to automatically lower the headlights based on a severity of the condition, time urgency to avoid blinding another driver, driver workload, etc., or other information specified as conditions in the context for execution 306 of the micro-interaction 302.

In another situation, one vehicle 102 may be following another and in some jurisdictions would need to lower the high-beams at a certain headway distance. In such a situation, the road rules application 174 may be configured to determine, based on a context for execution 306 of a micro-interaction 302 for whether it is required to lower the beams while following another vehicle 102 as tailored for the compiled road rules 204, and if so, what the current threshold headway distance for the location. If such a condition of the context for execution 306 is satisfied, then the road rules application 174 may be configured to invoke the micro-interaction 302 to communicate the condition to the driver, or in other cases to automatically adjust the headlights.

Yet another possible use case for the road rules application 174 may involve use of headlights in combination with wipers. Some jurisdictions may specify road rules information 202 indicating that it is mandatory to turn on headlights when the wipers are on. Accordingly, the context for execution 306 for a micro-interaction 302 may indicate in the context for execution 306 a condition in which the headlights are off but the wipers are on. If the road rules application 174 determines that the condition is satisfied, then the road rules application 174 may invoke the micro-interaction 302 to inform the driver or automatically turn on the headlights.

Other cases in which headlights may be an issue include tunnels, hills, blinding snow, two track roads, etc. In an example, a jurisdiction may include geofence road rule information 202 to address locations where headlights may be mandatory, suggested (e.g., tunnels, rural roads, etc.). It should be noted that the jurisdictions may be able to update the road rules information 202 maintained by their jurisdictional information server 162 in order to change the road rules information 202 to meet special circumstances. As some possibilities, a jurisdiction may update its road rules information 202 to require headlights could be required to be on all the time in winter, near a recent volcanic eruption, where the visibility is low, or could be suggested in observance of a specific event.

The road rules application 174 may also provide an advantage to the driver by documenting in storage (e.g., storage 112, storage 168, etc.) the underlying circumstances during which the driver received an infraction for actions taken. In an example, a driver may neglect to turn down the vehicle 102 high beam headlights when following too close to another vehicle 102 because there are bicycles driving erratically at the side of the road, and gets cited. The road rules application 174 may accordingly maintain a record of the driver instruction to the micro-interaction 302 indicating the context for execution 306 surrounding the driver decision to keep the beams high, which could be used in the driver's defense. The context for execution 306, for example, could include information collected from the vehicle's 102 pedestrian detection system indicating that there was another reason for the driver's action.

Another possible use case for the road rules application 174 may involve compliance with vehicle 102 turn-on-red rules. Most jurisdictions in the United States allow right turn on red, but there are exceptions, such as New York City where turns on red are only permitted where posted. In some jurisdictions turn-on-red is permissible except when there is a right turn arrow. Generally, a vehicle 102 attempting a right turn on red must stop, and then yield to through traffic from the left and left turn traffic from the opposite direction. However, where U-Turns are allowed, turn-on-red vehicle 102 traffic generally must also yield to U-Turn traffic. Some vehicles 102, such as school busses and vehicles 102 with hazardous material cargo, may not be permitted to make turns on red under any circumstances, depending on the road rule information 202 in a particular jurisdiction. In these cases the driver may invoke a micro-interaction 302 in which a sufficient description of the vehicle 102 can be given to determine the road rule information 202 in a jurisdiction in which the driver is likely to travel. The road rule information 202 may further account for variations in turn-on-red rules, such as that turn-on-red may also be prohibited or allowed during a specified window of time of day, on specific dates and times, on particular days of the week, on school days (that are defined by the local school district), on holidays, on days of special events (football days for example), ozone action days, etc. In some cases, turn-on-red rules may be posted on signs that are impossibly complicated to read and interpret in traffic, but can be posted as road rule information 202 by jurisdictions on their jurisdictional information server 162 and updated on-the-fly by traffic operations centers.

Another possible use case for the road rules application 174 may involve special lane usage rules. As some possibilities, lane road rule information 202 may include restrictions on turning such as "right-turn only", "left-turn only", "no-turn", "no lane changing", "lane changing with caution", etc. As some other possibilities, road rule information 202 may include time information related to the lane usages, such as certain days on the week that the rules are applicable, certain time windows during the day that the rules are applicable, special event days, etc. As some further possibilities, the road rule information 202 may include indications of the types of vehicles 102 to which they are applicable, as some rules may apply to specific vehicles 102 such as school buses or hazardous material cargos. For instance, rules for nuclear waste transport may only allow transport at certain times of day (or night) and only on specific roads and lanes. As yet a further possibility, some jurisdictions may only allow turns on red (both left and right) when it is to or from a one way and/or one lane street In another example, a jurisdiction may specify road rule information 202 indicating high-occupancy vehicle 102 lanes designating access to vehicles 102 of certain types or carrying a certain number of passengers. The road rule information 202 may further define the lanes via navigation system information or by geofencing information, and/or via forward facing video camera with image processing to detect HOV diamond symbols painted on the road surface. The road rules application 174 may identify the number of passengers required for access to the HOV by the road rule information 202, including such factors as date/time, type of vehicle 102, etc. The type of vehicle 102 can be determined by the road rules application 174, in an example, by the VIN number stored in a vehicle 102 memory, and a number of passengers may be determined by the road rules application 174 by an occupant classification system (or in other examples by counting the mobile phones detected within the vehicle 102 by the wireless transceiver 150, etc.). The road rules application 174 may be configured to notify the driver that the HOV either is or is not available for the vehicle 102. For instance, if the road rules application 174 determines that a context for execution 306 for a micro-interaction 302 related to HOV lane usage indicates that the lane is not available to the vehicle 102, the road rules application 174 may invoke the micro-interaction 302 activating a status message "HOV not available."

Another possible use case for the road rules application 174 may involve usage of turn signals. In some locations, a jurisdiction may define road rule information 202 indicating that a driver is to begin signaling a turn 100 meters (300 feet) before the turn. Other jurisdictions may define road rule information 202 including a shorter or longer distance. Some jurisdictions may define a first distance below a certain speed, and a second longer distance at or above that speed. The road rules application 174 may be configured to utilize a signaling distance micro-interaction 302 to inform the driver, based on a navigation route being traversed by the vehicle 102, if the vehicle 102 has not signaled an appropriate time or distance in the jurisdiction they are driving as specified by the context for execution 306 for the micro-interaction 302.

Yet another possible use case for the road rules application 174 may involve slow driving rules for vehicles 102 traveling under the posted speed limit. Some jurisdictions may specify road rule information 202 indicating that vehicles 102 driving below the "normal speed of traffic" should be in the right lane. Other jurisdictions may allow the two rightmost lanes to be used for slow driver on divided highways with more than two lanes. Some jurisdictions may specify road rule information 202 allowing an overtaking driver to pass on the right, or may allow such behavior according to number of lanes and/or type of zoning of the travel area. The road rules application 174 may be configured to utilize a passing micro-interaction 302 configured with a context for execution 306 related to the passing rules, such that when the condition is satisfied, may provide a response prompt 308 such as "No passing on right, please move to right lane or drive closer to the speed limit." The determination of passing may be performed, in an example, using vehicle detection sensors of the vehicle 102 utilized for adaptive cruise control, blind spot detection, etc. In another example, a micro-interaction 302 may be utilized to inform a driver if the vehicle 102 is traveling too slowly in the left lane.

Yet another possible use case for the road rules application 174 may involve rules for towing. Some jurisdictions may specify road rule information 202 indicating a maximum tow speed less than a maximum speed limit when towing, or a further reduced speed limit when towing above a predetermined amount of weight. Some jurisdictions may also specify road rule information 202 restricting gross vehicle weight and trailer dimensions, fifth wheel usage, etc. The road rules application 174 may utilize a towing micro-interaction 302 to identify to the user if a planned route causes the vehicle 102 to enter a jurisdiction disallowing the current vehicle 102 trailer.

Another possible use case for the road rules application 174 may involve cellphone/texting use. Some jurisdictions may specify road rule information 202 banning cellphone texting or talking, or banning cellphone use that is not hands-free. The road rule information 202 may further specify whether these offenses are primary (driver may be pulled over for the offense) or secondary (driver may receive a ticket if pulled over for something else). Some jurisdictions may also specify road rule information 202 prohibiting device usage in specific zones, such as school zones and emergency vehicle zones, where such usage may not be banned elsewhere. The road rule information 202 in some cases may specify device usage road rules information 202 that varies according to the age of the driver.

Yet another possible use case for the road rules application 174 may involve compliance with the boulevard rule. The boulevard rule may indicate that a vehicle 102 entering from a small road onto a larger road may be required to yield to the vehicle 102 on the larger road. Many jurisdictions may specify road rule information 202 indicating compliance with the boulevard rule. However, other jurisdictions may specify road rule information 202 giving traffic merging onto a highway the right-of-way.

Another possible use case for the road rules application 174 may involve determining what to do in complex situations. Complex situations may occur at intersections in which the driver is unfamiliar or otherwise unable to determine a correct action given time constraints and understanding of the jurisdictional rules. The road rules application 174 may accordingly be configured to utilize the micro-interactions 302 having contexts for execution 306 customized according to the compiled road rules 204 to inform the driver.

Figure 5:
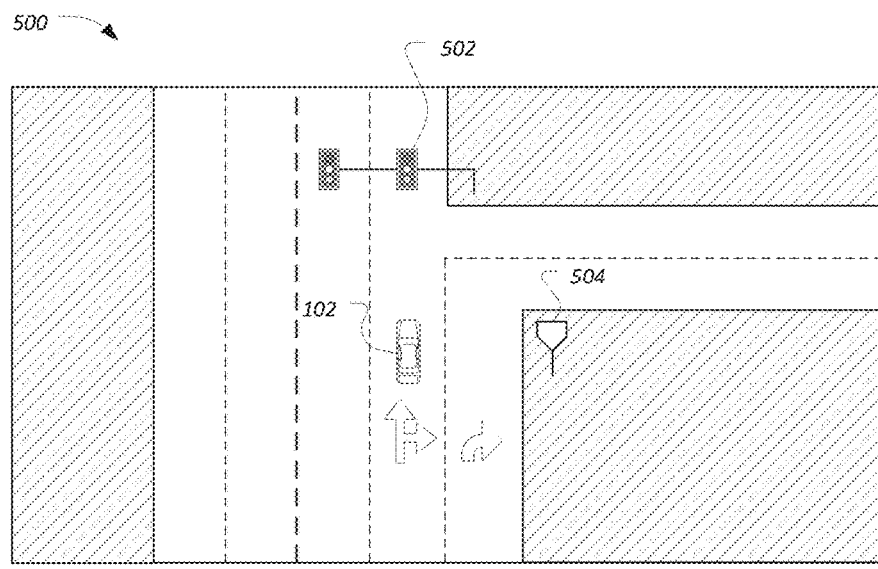
FIG. 5 illustrates an example complex situation to be analyzed according to the compiled road rules.

FIG. 5 illustrates an example 500 intersection in which a complex set of compiled road rules 204 are in place. As shown, a vehicle 102 is approaching the intersection in a lane that is the second lane from the right. In the example, a traffic light 502 is red, but a right turn arrow is green. Also in the example, a traffic control 504 indicates that there is no turn on red. The road rules application 174 may accordingly be able to determine, responsive to the driver selecting the right turn signal, whether a right turn may be made from the second lane or whether the vehicle 102 may be required to move into the rightmost lane or wait for the red light to change. The answer may be provided to the driver in the vehicle HMI as a micro-interaction 302 that informs the driver, for example, if the vehicle is in the first, second or third lanes and the signal light is red. Otherwise, the micro-interaction 302 may not be invoked and may not distract the driver by providing unnecessary information.

Figure 6:
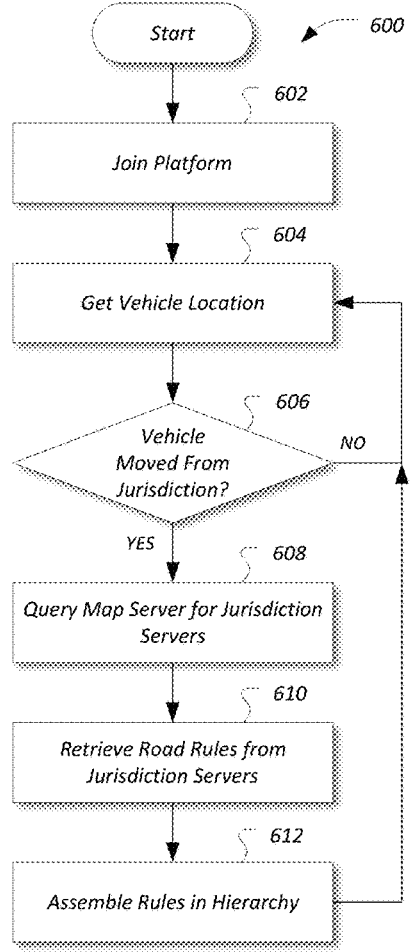
FIG. 6 illustrates an example process for assembling compiled road rules.

FIG. 6 illustrates an example process 600 for assembling compiled road rules 204. The process 600 may be performed, for example, by the vehicle 102 in communication with the jurisdiction information servers 162 over the communication network 156.

At operation 602, the vehicle 102 joins the jurisdiction information server 162 platform. In an example, the vehicle 102 may receive user input via the HMI of the vehicle 102 requesting execution of the road rules application 174. The vehicle 102 may accordingly direct the mobile device 152 to execute the road rules application 174 via the device link interface 172.

At operation 604, the vehicle 102 retrieves the location of the vehicle 102. In an example, the road rules application 174 may request the current vehicle 102 location from the vehicle 102, which may in turn request the location from the global positioning system module 146.

At operation 606, the vehicle 102 determines whether the vehicle 102 has moved to a jurisdiction for which the vehicle 102 does not have current compiled road rules 204. For example, if the vehicle 102 does not have compiled road rules 204 for the current vehicle 102 location, or if the compiled road rules 204 are stale (e.g., older than a predetermined amount of time such as one hour, one day, etc.), then the vehicle 102 may determine that new road rules should be identified. If the vehicle 102 does not have current compiled road rules 204 for the vehicle 102 location, control passes to operation 608. Otherwise control passes to operation 604.

At operation 608, the vehicle 102 queries the jurisdiction information servers 162 for information regarding the jurisdiction information server 162 maintaining road rules information 202 for the location of the vehicle 102. In an example, the road rules application 174 may maintain a listing of the jurisdiction information servers 162 (e.g., in the storage 168 or the storage 112), and may request the road rules information 202 from the appropriate national, state, county, and/or municipal servers from the vehicle 102.

At operation 610, the vehicle 102 retrieves the road rules information 202 from the jurisdiction information servers

162. In an example, the road rules application 174 may send a request to the global jurisdiction information server 162-A, which may collect the road rules information 202 from the appropriate national, state, county, and/or municipal servers, and may return the road rules information 202 to the vehicle 102. In another example, the road rules application 174 may query the relevant national, state, city, and/or municipality jurisdiction information servers 162 including the location of the vehicle 102 for road rules information 202.

At operation 612, the vehicle 102 assembles the road rules information 202 into compiled road rules 204. The compiled road rules 204 may accordingly represent the road rules for the specific location of the vehicle 102. In one non-limiting example, the compiled road rules 204 may apply the global road rules information 202, then override any differences with the national road rules information 202, then override any differences with the state road rules information 202, then override any differences with the county road rules information 202, then override any differences with the municipal road rules information 202. The road rules application 174 may then utilize the compiled road rules 204 as indicative of the total set of rules applicable to the current vehicle 102 location. After operation 612, control passes to operation 604.

Figure 7:
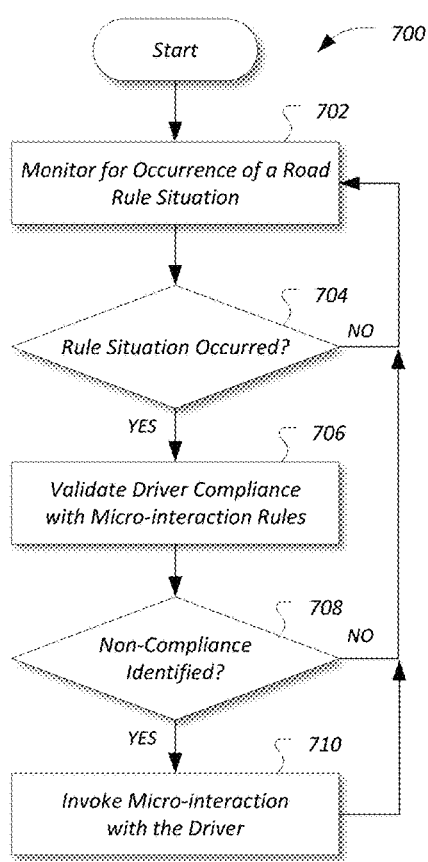
FIG. 7 illustrates an example process for initiating a micro-interaction based on driver behavior and the compiled road rules.

FIG. 7 illustrates an example process 700 for initiating a micro-interaction 302 based on driver behavior and the compiled road rules 204. As with the process 600, the process 700 may be performed, for example, by the vehicle 102 in communication with the jurisdiction information servers 162 over the communication network 156.

At operation 702, the vehicle 102 monitors for occurrence of a road rule situation. In an example, the road rules application 174 may receive input from the vehicle bus 142 to use to match against the contexts for execution 306 of the micro-interactions 302 of the system 100. At operation 704, the vehicle 102 determines whether a road rule situation occurred. In an example, the road rules application 174 may evaluate the contexts for execution 306 of the micro-interactions 302 using the received input to determine whether any situations indicated by the micro-interactions 302 have occurred. If a situation has occurred, control passes to operation 706. Otherwise, control passes to operation 702 to continue monitoring for occurrence of the conditions of the contexts for execution 306.

At operation 706, the vehicle 102 validates driver compliance with the rules of the micro-interaction 302. In an example, the road rules application 174 may determine, based on the compiled road rules 204, whether the driver response to the situation indicated by the micro-interaction 302 is appropriate for the current locale. At operation 708, the vehicle 102 determines whether the driver was non-complaint. If the driver did not perform consistent with the compiled road rules 204, control passes to operation 710. At operation 710, the vehicle 102 invokes the micro-interaction with the driver. Further aspects of the driver micro-interaction 302 are discussed with respect to the process 800 below. After operation 710, control passes to operation 702.

Figure 8:
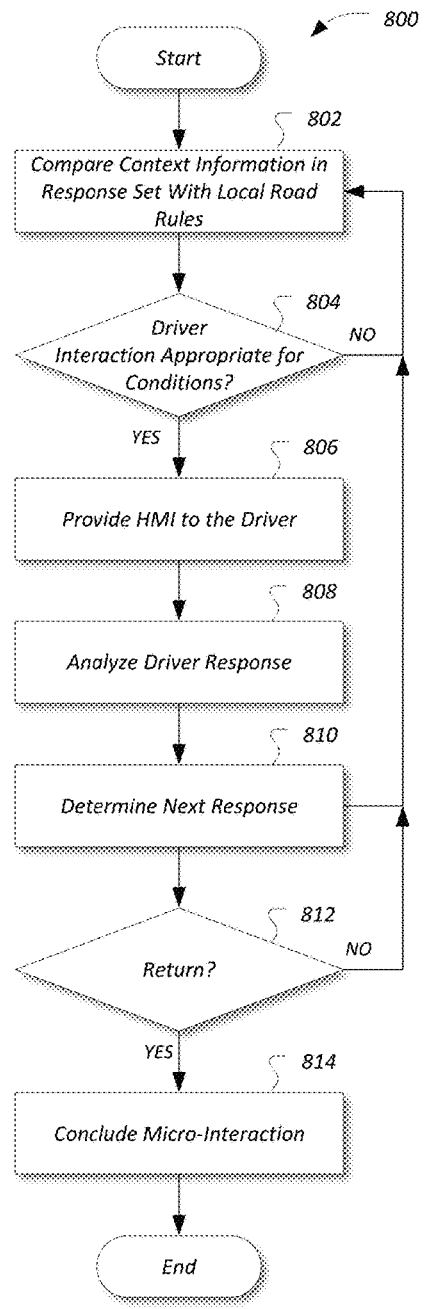
FIG. 8 illustrates an example process for performing a micro-interaction by the vehicle.

FIG. 8 illustrates an example process 800 for performing a micro-interaction 302 by the vehicle 102. As with the processes 600 and 700, the process 800 may be performed, for example, by the vehicle 102 in communication with the jurisdiction information servers 162 over the communication network 156. It should be noted that during the process 800, if the rule is no longer being broken or the condition otherwise no longer exists, then the process 800 may simply complete.

At operation 802, the vehicle 102 compares context information in a driver response to a presented micro-interaction 302 with conditions necessary to advise the driver of the rule of the road that may be violated. At operation 804, the vehicle 102 determines whether the driver interaction is appropriate according to current conditions. For example, if conditions are sufficiently safe or the driver is not overly busy then the road rules application 174 may determine to present HMI to the user indicating the non-compliance with the rules of the road, and control passes to operation 804. An example workload estimator is described in detail in U.S. 2014/0278087, filed Mar. 14, 2013 and titled Method and Apparatus for Predicting Times of High Driver Demand, the disclosure of which is hereby incorporated in its entirety by reference herein. If, however, the situation is deemed to be dangerous by the road rules application 174, or if for example the driver is considered to be drowsy, then the road rules application 174 may automatically correct the issue to the extent possible (e.g., turn on headlights, turn off high beams, etc.) and control passes to operation 802.

At operation 806, the vehicle 102 provides HMI to the driver to provide the response prompt 308 specified by the invoked micro-interaction 302. In an example, the road rules application 174 may provide a message in the vehicle 102 HMI or may provide a voice prompt indicating the violated rule of the road. FIG. 4 illustrates an example 400 of a response prompt 308 of a micro-interaction 302 provided in a display 138 within a gauge cluster 402 of the vehicle 102.

At operation 808, the vehicle 102 analyzes the driver response to the response prompt 308. For example, the road rules application 174 may utilize the recognition grammar 310 of the micro-interaction 302 to understand the voice or other HMI input to the vehicle 102 by the driver. In an example, the recognition grammar 310 may be incorporated into the current vehicle 102 HMI grammar via the device link interface 172.

At operation 810, the vehicle 102 determines a next response prompt 308 to provide to the driver. In an example, the road rules application 174 may utilize the response logic 312 of the micro-interaction 302 to determine whether a further prompt should be provide to the user or to conclude the micro-interaction 302. At operation 812, the vehicle 102 determines whether to return from the micro-interaction 30. If so, control passes to operation 814 to conclude the micro-interaction 302, and after operation 814, the process 800 ends. If not, control passes to operation 802 to continue the next portion of the micro-interaction 302.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system of a vehicle comprising:
a processor configured to
send, to a global jurisdiction information server, a request for addresses of a plurality of local jurisdiction information servers and associated jurisdictional boundaries;
request road rules information from the plurality of local jurisdiction information servers having associated jurisdictional boundaries including a current location of the vehicle;

compile, from a hierarchy of the road rules information, rules for the current location, such that road rules information for smaller geofence areas including the current location override road rules information for larger geofence areas including the current location;
monitor system bus activity of the vehicle to identify occurrence of a road situation for which driving rules vary by locale;
determine whether a driving behavior is in conflict with a rule for the current location corresponding to the road situation; and
when a conflict is detected, invoke an interaction associated with the compiled rule to address the driving behavior.

2. The system of claim 1, wherein the processor is further configured to at least one of:
automatically correct the driving behavior of a driver of the vehicle according to the interaction; and
prompt the driver of the vehicle, in a human-machine interface of the vehicle, to correct the driving behavior according to a response prompt of the interaction.

3. The system of claim 1, wherein the processor is further configured to:
retrieve road rules information from at least one jurisdiction information server; and
compile the road rules information into compiled rules for the current location of the vehicle.

4. The system of claim 1, wherein the processor is further configured to:
send, to a global jurisdiction information server, a request for road rules information for the location of the vehicle; and
receive, from the global jurisdiction information server, the road rules information based on collection, by the global jurisdiction information server, of road rules information from at least one local jurisdiction server overriding a road rule of the global jurisdiction information server.

5. The system of claim 1, wherein the processor is further configured to:
customize trigger criteria of a context for execution of the interaction in accordance with the compiled rule for the current location; and
determine that the driving behavior is in conflict with the compiled rule when the system bus activity indicates that the context for execution has occurred.

6. The system of claim 1, wherein the road situation includes at least one of headlights off during a time of day where the compiled rule indicates headlights should be on, headlights off when wipers are on where the compiled rule indicates headlights should be on when wipers are on, high beam headlights on with oncoming traffic nearer than allowable by the compiled rule, following distance too close than allowable by the compiled rule, performing a turn-on-red indicated as improper by the compiled rule, use of a lane indicated as being improper by the compiled rule, lack of activation of turn signals at least a distance before a turn or lane change specified by the compiled rule as improper passing according to the compiled rule, exceeding a lower speed limit for towing when towing as specified according to the compiled rule, use of a mobile device within the vehicle in contravention of the compiled rule, and lack of compliance with a boulevard yielding rule specified by the compiled rule.

7. A system comprising:
a computing device associated with a vehicle and executing a road rules application configured to:
send, to a global jurisdiction information server, a request for addresses of a plurality of local jurisdiction information servers and associated jurisdictional boundaries;
request road rules information from the plurality of local jurisdiction information servers having associated jurisdictional boundaries including a location of the vehicle;
compile the road rules information into compiled rules for the location;
identify occurrence of a road situation in which a driving behavior is in conflict with one of the compiled rules; and
invoke an interaction associated with the one of the compiled rules to address the driving behavior.

8. The system of claim 7, wherein the computing device is further configured to execute the road rules application to:
customize trigger criteria of a context for execution of the interaction in accordance with the compiled rule for the location of the vehicle; and
determine that the driving behavior is in conflict with the compiled rule when system bus activity indicates that the context for execution has occurred.

9. The system of claim 7, wherein the computing device is further configured to execute the road rules application to:
retrieve a second location of the vehicle;
determine that the second location of the vehicle is located in a jurisdictional boundary in which the compiled rules lack associated road rules information;
request road rules information from the plurality of local jurisdiction information servers having associated jurisdictional boundaries including the second location of the vehicle; and
recompile the road rules information into updated compiled rules for the second location.

10. The system of claim 9, wherein the computing device is further configured to execute the road rules application to:
identify occurrence of a road situation in which a driving behavior is in conflict with one of the updated compiled rules; and
invoke an interaction associated with the one of the updated compiled rules to address the driving behavior.

11. A method comprising:
sending, to a global jurisdiction information server, a request for addresses of a plurality of local jurisdiction information servers and associated jurisdictional boundaries;
requesting road rules information from the plurality of local jurisdiction information servers having associated jurisdictional boundaries including a location of a vehicle;
compiling the road rules information into compiled rules for the current location;
determining whether a driving behavior is in conflict with a rule for the current location corresponding to an identified road situation; and
when a conflict is detected, invoking an interaction associated with the rule to address the driving behavior.

12. The method of claim 11, further comprising:
automatically correcting the driving behavior of a driver of the vehicle according to the interaction; and
prompting the driver of the vehicle, in a human-machine interface of the vehicle, to correct the driving behavior according to a response prompt of the interaction.

13. The method of claim 11, further comprising:
retrieving road rules information from at least one jurisdiction information server; and compiling the road rules information into compiled rules for the current location of the vehicle.

14. The method of claim 11, further comprising:
sending, to a global jurisdiction information server, a request for road rules information for the location of the vehicle; and
receiving, from the global jurisdiction information server, the road rules information based on collection, by the global jurisdiction information server, of road rules information from at least one local jurisdiction server overriding a road rule of the global jurisdiction information server.

15. The method of claim 11, further comprising:
customizing trigger criteria of a context for execution of the interaction in accordance with the compiled rule for the current location; and
determining that the driving behavior is in conflict with the compiled rule when the system bus activity indicates that the context for execution has occurred.

16. The system of claim 7, wherein the computing device is further configured to compile the road rules information into compiled rules for the location such that road rules information for jurisdictional boundaries including smaller geofence areas override road rules information for jurisdictional boundaries including larger geofence areas.

* * * * *